United States Patent [19]
Baker et al.

[11] Patent Number: 5,143,348
[45] Date of Patent: Sep. 1, 1992

[54] EASY-OPENING, HIGH PRESSURE GATE VALVE

[76] Inventors: Dwight Baker; James C. Baker, both of P.O. Box 249, Rush Springs, Okla. 73082; Randall King, 525 Allen, Duncan, Okla. 73533; Elton W. Eads, Rt. 1 Box 76E, Ninnekah, Okla. 73067

[21] Appl. No.: 749,275

[22] Filed: Aug. 23, 1991

[51] Int. Cl.[5] .............................................. F16K 3/18
[52] U.S. Cl. ..................................... 251/158; 251/326
[58] Field of Search ............... 251/158, 167, 175, 193, 251/195, 326, 328

[56] References Cited
U.S. PATENT DOCUMENTS

| | | | |
|---|---|---|---|
| 3,078,865 | 2/1963 | Estes et al. | 137/246.22 |
| 3,135,285 | 6/1964 | Volpin | 137/246.12 |
| 3,367,625 | 2/1968 | Fortune | 251/172 |
| 3,405,911 | 10/1968 | Bolling, Jr. | 251/193 X |
| 3,497,177 | 2/1970 | Hulsey | 251/172 |
| 3,834,664 | 9/1974 | Atkinson | 251/174 |
| 4,029,294 | 6/1977 | McCaskill et al. | 251/282 |
| 4,116,419 | 9/1978 | Diehl et al. | 251/196 |
| 4,161,309 | 7/1979 | Klyce | 251/328 |
| 4,513,947 | 4/1985 | Amend | 251/174 |

*Primary Examiner*—John C. Fox
*Attorney, Agent, or Firm*—Nies, Kurz, Bergert & Tamburro

[57] ABSTRACT

A gate lifter for shifting a gate from a valve seat in a gate valve. The gate lifter is provided on the downstream, or low pressure side of a valve, and is a tubular structure that surrounds and is slidable relative to a tubular valve seat. Hydraulic or other pressurized fluid is adapted to be introduced between an end of the lifter and a flange carried by the valve seat to cause the parts to move in opposite directions, as a result of which the lifter operates by shifting the gate member away from the valve seat to avoid damage to the valve seat as the gate member is moved there across. The gate lifter includes a face that is adapted to engage with a corresponding face of the gate member, the gate lifter face preferably including a low friction coating, such as teflon, gearings or gearing type material.

26 Claims, 2 Drawing Sheets

EASY-OPENING, HIGH PRESSURE GATE VALVE

BACKGROUND OF THE INVENTION

1. Field of the Invention

The present invention relates to gate valves, and more particularly to an improved downstream seat and guide structure for gate valves subjected to high pressure differentials across the gate, whereby the force necessary to shift the gate from a closed position to an open position while the valve is subjected to a large pressure differential is substantially reduced.

2. Description of the Related Art

Gate valves for controlling the flow of fluids typically include a slidable gate member that is adapted to be moved from a first position in which a solid portion of the gate blocks the flow through the valve, to a second position in which a flow opening that extends through the gate is aligned with the flow passageway and thus permits flow of fluid through the valve.

The gate is generally a slab-type, planar member having opposed parallel faces that contact and slide across respective upstream and downstream valve seats positioned within the valve body for sealing purposes and through which the fluid flows. The gate includes an offset flow opening of substantially the same diameter as the flow passageway through the valve, the gate opening being adapted to be moved into and out of registry with the flow passageway to alternately permit flow through the valve and to prevent flow therethrough.

Operation of the gate is generally effected by a circular hand wheel that is spaced outwardly from the valve body. The hand wheel is normally positioned at the outer end of a threaded, rotatable stem that extends outwardly from and threadedly engages the valve body. The inner end of the stem is connected with an end of the gate and is freely rotatable relative to the gate so that the linear movement of the stem into and out of the valve body carries with it the gate to control the flow of fluid through the valve.

Positioned against and in facing relationship with each face of the gate is a valve seat, which is generally a ring-shaped structure that has an interior passageway that corresponds in shape and size with the flow passageway through the valve, and which generally includes various types of sealing elements, such as 0-rings, or the like, to effect a seal between the valve seats and the respective faces of the gate, as well as with the valve body within which the seats are carried.

The force necessary to turn the handwheel and shift the gate from a closed, no-flow position to an open, flow position is dependent upon the size of the gate and the contact area between the gate and the valve body, as well as upon the flow area within the valve body and the fluid pressure differential that exists across the valve and the gate. Consequently, for small valves having flow passageways of the order of about 1 to 3 inches or so in diameter and subjected to relatively low pressure differentials, less than about 1,000 psi., normally the valve can be readily opened and closed by manual rotation of a properly sized hand wheel. However, for larger valves, those having flow passageway diameters greater than about 3 inches or so, and also for valves subjected to relatively high pressure differentials, for example 5,000 psi. or greater, oftentimes it is very difficult to manually turn the hand wheel because of the high frictional resistance to gate movement that results from the high upstream pressure exerted against the gate, and that pushes the gate against the interior surfaces of the valve body and downstream seat, with the result that the axial force necessary to move the gate exceeds the force that can be developed by manually turning a hand wheel.

Several approaches have been suggested to reduce the force necessary to operate such high pressure, large diameter, gate-type flow control valves. For example, in U.S. Pat. No. 3,367,625, which issued on Feb. 6, 1968, to Ronald Fortune, there is shown a gate valve that includes a pair of pressurized annular pistons that are aligned with each other and that are each positioned against a respective face of the gate. The annular pistons are of channel-shape in cross section and are slidable axially within annular recesses formed in the valve body and surrounding the flow passageway. The recesses communicate with a source of pressurized fluid that acts to urge each of or only one of the annular pistons against its respective gate face to thereby alter the direction and amount of thrust load acting on either or both sides of the gate.

Another arrangement suggested to reduce the force necessary to move a gate valve gate from a closed position to an open position is shown in U.S. Pat. No. 4,161,309, which issued Jul. 17, 1979, to Thomas A. Klyce. That patent discloses a fluid bypass arrangement wherein high pressure fluid from the high pressure side of the valve is conveyed to and radially expands an elastomeric O-ring into a larger diameter within an annular pocket, to permit flow from the high pressure side of the gate to the low pressure side and thereby equalize the pressures acting on the sides of the gate.

It is an object of the present invention to provide an improved friction-reducing arrangement that avoids subjecting the valve seat sealing surface on the low pressure side of a high pressure gate valve to excessive pressure that could cause premature wear of the sealing surface.

SUMMARY OF THE INVENTION

Briefly stated, in accordance with one aspect of the present invention, a gate valve is provided having a valve seat assembly that includes on at least one face of the gate a first tubular member carried by the valve housing, the first tubular member having a first transverse end face defining a valve seat. The tubular member includes a second transverse end face that is spaced from the first end face, the spacing between the first and second transverse end faces defining the axial length of the first tubular member. A tubular member also includes a laterally outwardly extending flange that is spaced axially from the first transverse face. A second tubular member is provided and is concentric with and surrounds the first tubular member so as to be slidable axially relative thereto. A second tubular member includes a first transverse end that carries a guide surface adapted to contact a surface of a gate of a gate valve and a second transverse end spaced from the first transverse end. The second tubular member has an axial length less than that of the first tubular member to define a gap between the flange of the first tubular member and the second transverse end surface of the second tubular member to permit pressurized fluid to enter between the tubular members and urge their separation in an axial direction.

DESCRIPTION OF THE PREFERRED EMBODIMENTS

Figure 1:
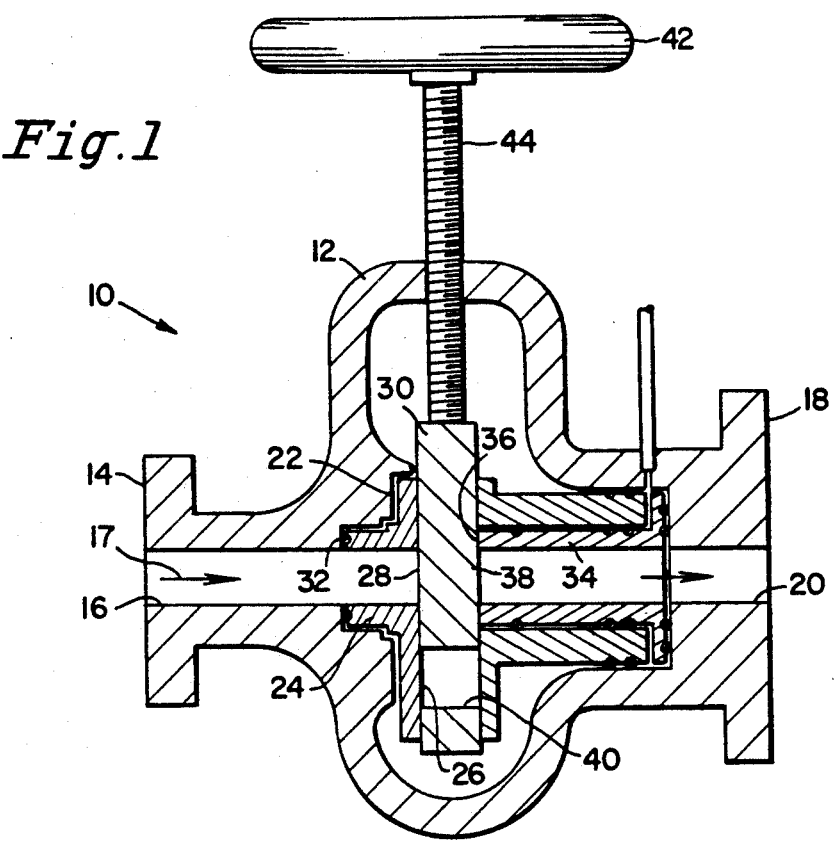
FIG. 1 is a longitudinal, cross-sectional view of a gate valve including a force-reducing gate lifter in accordance with the present invention.

Referring now to the drawings, and particularly to FIG. 1 thereof, there is shown a gate valve 10 including a valve body 12 having an inlet flange 14 that surrounds an inlet passageway 16. Flow of fluid through valve 10 is in the direction shown by arrow 17. An outlet flange 18 is provided on the opposite side of valve body 12 from inlet flange 14 and includes an outlet passageway 20 that is coaxial with inlet passageway 16. Preferably, inlet passageway 16 and outlet passageway 20 have the same size and configuration to provide smooth flow through the valve body.

Carried within valve body 12 adjacent the innermost end of inlet passageway 16, and within an annular recess 22 is an upstream valve seat 24 of generally annular configuration. Seat 24 includes a sealing face 26 adapted to face and to engage with upstream face 28 of a gate member 30. Seat 24 can include an O-ring 32 to provide a seal with recess 22 to prevent flow between seat 24 and recess 22.

Similarly, a downstream valve seat 34 is provided and is also a generally annular structure, having a sealing face 36 adapted to face and to engage with downstream face 38 of gate member 30.

Gate member 30 is generally in the form of a slab of material, such as steel, that has a rectangular cross section both longitudinally as well as transversely. A gate opening 40 is provided that extends through gate member 30 from upstream face 28 to downstream face 38 and preferably has a cross-sectional area and configuration corresponding with those of inlet passageway 16 and of outlet passageway 20 to minimize pressure loss caused by fluid turbulence that would otherwise exist when the valve is fully open. Gate opening 40 is offset from the centroid of gate member 30 and is adapted to be brought into and out of registry with the inlet and outlet flow passageways by movement of gate member 30 in a direction parallel with its longitudinal axis to selectively permit flow through the valve when opening 40 is aligned with inlet and outlet passageways 16 and 20, respectively, and to prevent flow through the valve when opening 40 is shifted laterally relative to the axes of inlet and outlet passageways 16 and 20. Gate upstream and downstream faces 28 and 38, respectively, engage the respective valve seat faces in such a way that the assembly provides a sealed structure in which flow is permitted to take place from inlet passageway 16 to outlet passageway 20 only through gate opening 40.

In the position in which it is shown in FIG. 1, gate opening 40 is displaced below the inlet and outlet flow passageways 16 and 20, to thereby present the solid surfaces of gate member 30 opposite the upstream and downstream valve seats 24 and 34 to prevent the flow of fluid through valve 10. Shifting of gate member 30 in an upward direction, as viewed in FIG. 1, to bring gate opening 40 into registry with the flow passageways, is accomplished by turning a handwheel 42, which is non-rotatably connected with and turns threaded rotatable stem 24, which is, in turn, rotatably carried at the upper end of gate member 30, so that stem 44 and gate member 30 are both shifted in an upward direction. Gate member 30 is guided by suitable guide structure within valve body 12 and is restrained from rotating about its longitudinal axis so that it only moves linearly, and in a transverse direction relative to the flow axis defined by inlet and outlet flow passageways 16 and 20.

Figure 2:
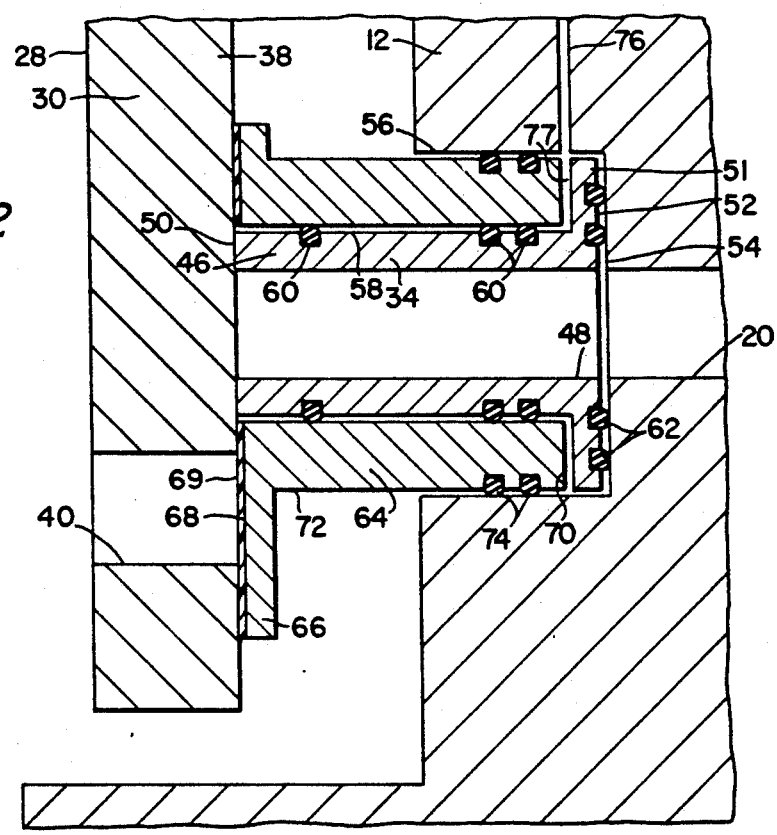
FIG. 2 is an enlarged, fragmentary, cross-sectional view showing gate lifter structure within the valve housing adjacent the downstream face of the gate for the valve shown in FIG. 1.

Referring now to FIG. 2, which is an enlarged, fragmentary, cross-sectional view showing gate 30 and downstream valve seat 34, the structure of valve seat 34 is defined by a tubular member 46 having an inner surface 48 corresponding in size and cross-sectional shape with outlet passageway 20, and having a first, inner transverse end face 50 that acts as a sealing surface and defines a valve seat. End face 50 is positioned to face and to engage with downstream face 38 of gate member 30.

A flange-like projection 51 at the opposite end of valve seat 34 includes a second, outer transverse end face 52, which is spaced axially from first transverse end face 50, and is opposite the transverse face 54 of an annular recess 56 defined by a counterbore formed in valve body 12 to be concentric with outlet passageway 20 and to receive valve seat 34. Outer transverse end face 52 extends laterally outwardly beyond the outer surface 58 of valve seat 34.

Outer surface 58 of valve seat 34, as shown, includes three longitudinally spaced, annular recesses 60 to receive respective O-rings for sealing purposes. Second transverse end face 52 also includes a pair of concentric annular grooves 62 to receive respective O-rings to provide a seal with transverse face 54 of recess 56.

Surrounding valve seat 34 and slidably carried on outer surface 58 is a gate lifter 64 of tubular form. Gate lifter 64 includes a transverse end flange 66 that faces gate member 30, the end flange being eccentrically positioned relative to the longitudinal axis of passageway 20, and having a sufficient area to cover gate opening 40 when gate member 30 is in its lowermost, retracted position as shown in FIG. 2. End flange 66 includes an end face 68 that faces gate downstream face 38 and preferably includes a friction-reducing surface coating 69, such as, for example a Teflon bearings or bearing type material for minimizing friction between end flange 66 and gate member 30.

The end of gate lifter 64 that is opposite from end flange 66 includes a transverse end face 70 that is positioned opposite flange 51 of valve seat 34. As shown in FIG. 2, the outer surface 72 of gate lifter 64 includes a pair of spaced annular recesses 74 to receive respective O-rings for sealing against the inner surface of recess 56.

Valve body 12 includes a fluid conduit 76 that extends outwardly from recess 56 at a point that is opposite an annular space defined between transverse end face 70 of gate lifter 64 and transverse face 77 of flange 51 carried by valve seat 34.

In operation, when gate member 30 of valve 10 is initially in a closed position, as shown in each of FIGS. 1 and 2, pressurized fluid within inlet passageway 16 acts against upstream face 28 of gate member 30 to urge it toward downstream seat 34. The magnitude of the force acting on the downstream seat is a function of the pressure differential between the fluid in inlet passageway 16 and the fluid in outlet passageway 20. If, as is often the case, the valve outlet is open to atmospheric pressure, the force acting on the downstream seat can be considerable, especially in a large diameter, high pressure valve.

When it is desired to open the valve to permit flow therethrough, before hand wheel 22 is turned to attempt to effect movement of gate member 30, pressurized fluid, such as hydraulic fluid, is introduced at a sufficient pressure level through conduit 76 to enter the gap between end face 70 of gate lifter 64 and flange 51 of valve seat 34. The pressure of the fluid acts against gate lifter 64 to move it in a direction toward the left, as viewed in FIG. 2, to counteract the opposite force imposed on gate member 30 as a result of the upstream pressure acting against gate upstream face 28.

Movement of gate lifter 64 a small distance is sufficient to move gate member 30 off end face 50 of valve seat 34 so that excessive pressure is not applied to valve seat 34. The Teflon or other material serving as bearing surface 68 on gate lifter 64 reduces the frictional drag on the gate member.

A slight amount of movement of gate lifter 64 is sufficient to move gate member 30 off valve seat 34, and permit fluid flow between gate member 30 and valve seat 34 to thereby reduce the pressure differential. Hand wheel 42 can then be easily turned to move gate member 30 upwardly so that gate opening 40 is brought into registry with each of inlet passageway 16 and outlet passageway 20, to thereby permit flow of fluid to take place through the valve.

It has been found that the magnitude of the pressure of the fluid acting on the end of the gage lifter in order to lift the gate from the valve seat should desirably be in the vicinity of from about 15% to about 25% greater than the upstream pressure acting against the gate member. Thus, in a valve in which the upstream or line pressure is 15,000 psi., a pressure on the gate lifter of at least about 17,500 psi. is desirable to lift the gate from the downstream seat. Similarly, if the upstream or line pressure acting on the gate member is 6,000 psi, then at least about 7,200 psi. of pressure is desirable to lift the gate from the seat.

The disclosed arrangement reduces surface friction and drag between the gate and the downstream seat by about 75% to 85% of the drag that would exist without the structure of the present invention Consequently, the torque necessary to turn the handwheel to operate the valve is substantially reduced.

Figure 3:
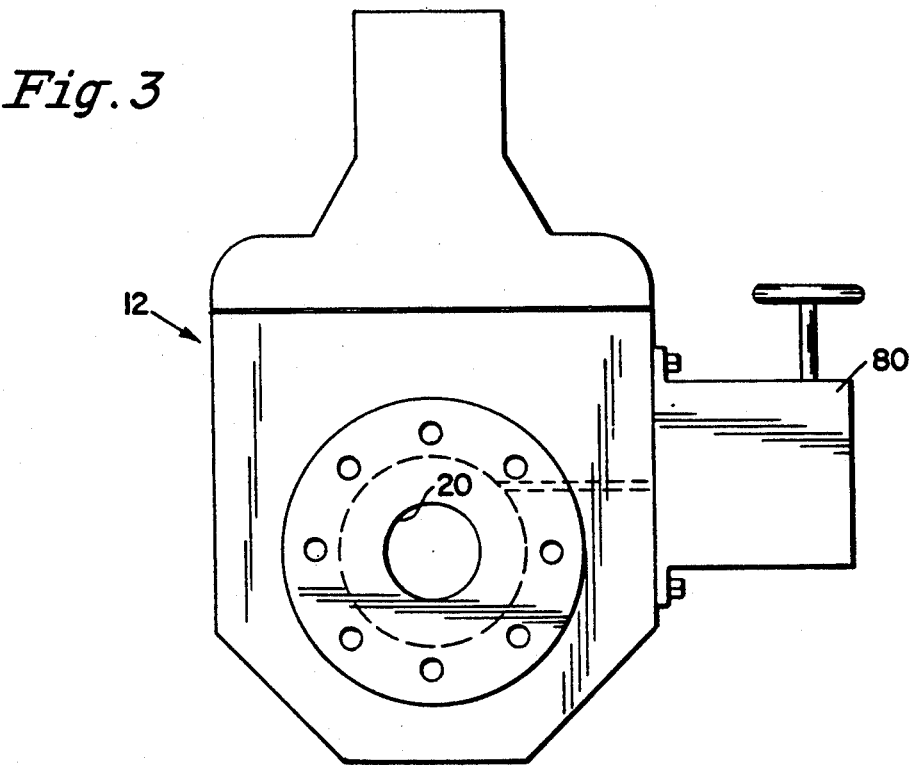
FIG. 3 is an end view of a gate valve having the internal structure shown in FIG. 2, viewed from the downstream, or low pressure, side, showing the valve with one form of gate lifter pressurization apparatus carried on the exterior of the valve body.

The source of the fluid pressure to actuate the gate lifter can be provided by a hand-operated pump that is external to the interior of the valve. As an example, a pump device 80 as shown in FIG. 3, such as an hydraulic jack, can be used, and can be positioned on one side of valve body 12 as shown. Conduit 76 extends between pump 80 and the gap between the gate lifter and the downstream valve seat.

Alternatively, if desired, a separate external source of pressurized hydraulic fluid can be connected with the valve body, if desired and if such a source of pressurized hydraulic fluid is readily available in the environment in which the valve is installed. Control of the pressure acting against the gate lifter can be maintained by monitoring a suitable pressure gauge (not shown) to avoid an overpressure situation wherein excessive force is applied to the downstream side of the gate member, which could cause an increase in the force required to operate the handwheel because of a large pressure unbalance between the upstream and downstream sides of the gate member.

Figure 4:
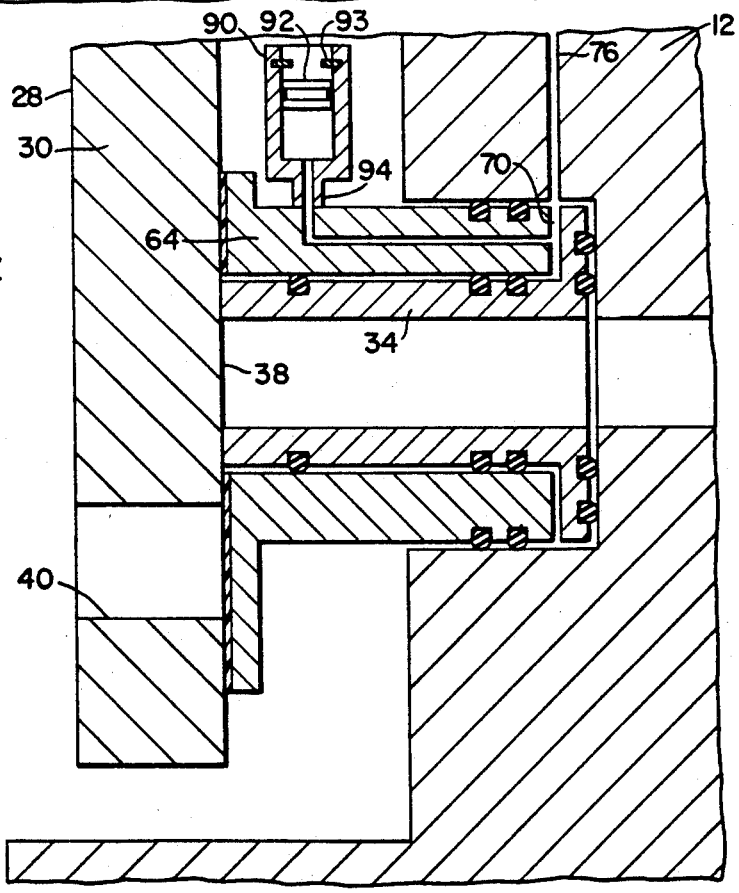
FIG. 4 is a view, similar to FIG. 2, of another embodiment of the present invention showing the valve with gate lifter pressurization apparatus carried within the valve body.

An alternative arrangement for reducing frictional drag on the gate member is shown in FIG. 4, which shows generally the same structure as in FIG. 2, with the addition of an hydraulic cylinder 90 positioned within valve housing 12 and carried by gate lifter 64. Cylinder 90 includes a piston 92, and a passageway 94 extends through gate lifter 64 to interconnect cylinder 90 and the outer end 70 of gate lifter 64. The fluid pressure within valve body 12, which is generally the upstream or line pressure, acts on piston 92 through opening 93 to impose a pressure on end face 70 to thereby shift gate lifter 64 toward gate member 30 to partially offset the opposite force imposed on gate member 30 by the upstream pressure acting on gate upstream face 28. Because of fluid pressure losses within cylinder 90 and passageway 94, the offsetting force will be less than that acting on the upstream face of the gate member. However, even though it is less, that pressure still operates to reduce the force necessary to shift the gate member, as compared with the force that would be necessary without the offsetting arrangement.

In the FIG. 4 embodiment conduit 76 communicates with an hydraulic reservoir (not shown), which can be isolated from the interior of valve 10 by a suitable isolation valve (not shown), as will be appreciated by those skilled in the art.

The present invention has been illustrated and described in terms of the provision of the improved valve seat and gate lifter only on the downstream side of the valve. However, those skilled in the art will appreciate that the same type of valve seat and gate lifter structure can also be provided on the upstream side of the valve, to thereby render the valve reversible.

As will be apparent, the present invention provides significant advantages over the previously-employed structures, particularly in that loads and drag acting against the seat surface are significantly reduced, thereby providing longer seat and gate life. Additionally, galling and associated wear problems of gate and seat surfaces, as well as gate and seat lockup, are eliminated. Consequently, the maintenance requirements for such valves is reduced and the effective operating life of the valves is significantly extended.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A valve seat assembly for a gate valve, said assembly comprising:
   a) a seat member having an annular cross section and including a first transverse end face defining a valve seat and a second transverse end face spaced from the first end face along a longitudinal axis of the seat member;

b) a gate lifter member for lifting and spacing a gate valve gate from a valve seat, the lifter member positioned adjacent to and slidable relative to the seat member in a direction parallel with the seat member longitudinal axis, the lifter member including a first transverse end adjacent the valve seat and defining a guide surface adapted to contact a planar surface of a gate of a gate valve, the guide surface adapted to be substantially coplanar with the valve seat in an initial position of the seat member and lifter member, and a second transverse end spaced from the first transverse end so that fluid pressure imposed upon the second transverse end of the lifter member shifts the lifter member relative to the seat member so that the guide surface of the lifter member urges a gate valve gate away from the valve seat.

2. A valve seat assembly in accordance with claim 1 wherein the lifter member surrounds the seat member.

3. A valve seat assembly in accordance with claim 2 wherein the lifter member is concentric with the seat member.

4. A valve seat assembly in accordance with claim 3 wherein each of the seat member and the lifter member is a tubular structure.

5. A valve seat assembly in accordance with claim 1 wherein the seat member includes a laterally outwardly extending flange that is axially spaced from the valve seat.

6. A valve seat assembly in accordance with claim 5 wherein the seat member and the lifter member are concentric, and the lifter member extends between the valve seat and the seat member flange.

7. A valve seat assembly in accordance with claim 6 wherein the lifter member had an axial length less that the axial spacing between the valve seat and the seat member flange.

8. A valve seat assembly in accordance with claim 6 wherein the lifter member surrounds the seat member.

9. A valve seat assembly in accordance with claim 7 including a least one seal positioned between the lifter member and the seat member to prevent fluid flow between the lifter member and the seat member.

10. A valve seat assembly in accordance with claim 1 wherein the guide surface has a surface area greater than the surface area of the valve seat.

11. A valve seat assembly in accordance with claim 10 wherein the guide surface includes a coating having a low coefficient of friction to minimize frictional drag between the guide surface and a gate member face when the guide surface is positioned against a gate member.

12. A gate valve comprising:
  a. a valve body having a flow inlet and a flow outlet, and a flow passageway extending between the inlet and outlet and having a flow axis;
  b. a gate member positioned within the valve body and movable transversely relative to the flow passageway axis to selectively open and close the flow passageway, the gate member including a pair of spaced, parallel gate surfaces each defined by an outwardly facing planar face surface and including a gate passageway through the gate member for alignment with the flow passageway to permit flow through the gate member when the gate passageway is aligned with the flow passageway;
  c. a pair of annular valve seats each having a flow passageway extending therethrough and each carried in a respective seat recess provided within the valve body in spaced relationship along the flow axis and on opposite sides of the gate member, the seats each including a seat face adapted for engagement with a respective gate face surface element, wherein at least one of the valve seats includes:
    1) a seat member having an annular cross section and including a first transverse end face defining a valve seat and a second transverse end face spaced from the first end face along a longitudinal axis of the seat member; and
    2) a gate lifter member for lifting and spacing a gate valve gate from a valve seat, the lifter member positioned adjacent to and slidable relative to the seat member in a direction parallel with the seat member longitudinal axis, the lifter member including a first transverse end adjacent the valve seat and defining a guide surface adapted to contact a planar surface of a gate of a gate valve, the guide surface adapted to be substantially coplanar with the valve seat in an initial position of the seat member and lifter member, and a second transverse end spaced from the first transverse end so that fluid pressure imposed upon the second transverse end of the lifter member shifts the lifter member relative to the seat member so that the guide surface of the lifter member urges the gate away from the valve seat.

13. A gate valve in accordance with claim 12 wherein the lifter member surrounds the seat member.

14. A gate valve in accordance with claim 13 wherein the lifter member is concentric with the seat member.

15. A gate valve in accordance with claim 14 wherein each of the seat member and the lifter member is a tubular structure.

16. A gate valve in accordance with claim 12 wherein the seat member includes a laterally outwardly extending flange that is axially spaced from the valve seat.

17. A gate valve in accordance with claim 16 wherein the seat member and the lifter member are concentric, and the lifter member extends between the valve seat and the seat member flange.

18. A gate valve in accordance with claim 17 wherein the lifter member had an axial length less that the axial spacing between the valve seat and the seat member flange.

19. A gate valve in accordance with claim 17 wherein the lifter member surrounds the seat member.

20. A gate valve in accordance with claim 18 including a least one seal positioned between the lifter member and the seat member to prevent fluid flow between the lifter member and the seat member.

21. A gate valve in accordance with claim 12 wherein the guide surface has a surface area greater than the surface area of the valve seat.

22. A gate valve in accordance with claim 21 wherein the guide surface includes a coating having a low coefficient of friction to minimize frictional drag between the guide surface and a gate member face when the guide surface is positioned against a gate member.

23. A gate valve in accordance with claim 12 including a fluid-carrying conduit formed in the valve body and extending from a point external to the valve body to a point adjacent the second transverse end of the lifter member for conveying pressurized fluid to the lifter member to shift the lifter member toward the gate and thereby lift the gate from the valve seat.

24. A gate valve in accordance with claim 23 including an external pressurized fluid source attached to the valve body and in communication with the fluid-carrying conduit.

25. A gate valve in accordance with claim 12 including a piston and cylinder positioned within the valve body, the cylinder being open at one end to the pressure existing within the valve body and including a conduit extending from an opposite end to the second transverse end of the lifter member to convey pressurized fluid to the lifter member to lift the gate member from the valve seat.

26. A gate valve in accordance with claim 25 wherein the conduit extends within the lifter member.

* * * * *